United States Patent
Iwamoto (10) Patent No.: US 6,332,856 B1
(45) Date of Patent: Dec. 25, 2001

(54) CONTINUOUSLY VARIABLE TRANSMISSION

(75) Inventor: Michitaka Iwamoto, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/479,836

(22) Filed: Jan. 7, 2000

(30) Foreign Application Priority Data

Jan. 29, 1999 (JP) .................................................. 11-022840

(51) Int. Cl.[7] .............................. F16H 37/02; F16H 9/12; F16H 9/18
(52) U.S. Cl. .............................. 475/210; 474/29; 474/18
(58) Field of Search ........................... 475/210, 206, 475/44, 66, 39, 68, 326, 328; 474/29, 18, 8

(56) References Cited

U.S. PATENT DOCUMENTS

| | | | |
|---|---|---|---|
| 4,467,670 | * | 8/1984 | Kawamoto ........................ 475/210 X |
| 5,052,990 | * | 10/1991 | Sakakibara et al. ................ 475/210 |
| 5,295,920 | * | 3/1994 | Sawasaki et al. .................... 475/210 |
| 5,480,361 | * | 1/1996 | Murakami et al. ................... 475/328 |
| 5,649,457 | * | 7/1997 | Kudou et al. .................... 475/200 X |
| 5,672,132 | * | 9/1997 | Schwab ..................................... 474/8 |
| 5,782,718 | | 7/1998 | Wakahara . |
| 6,066,058 | * | 5/2000 | Kashiwase ........................... 475/44 |

FOREIGN PATENT DOCUMENTS 8-14344   1/1996   (JP) .
10-196749   7/1998   (JP) .

* cited by examiner

Primary Examiner—David A. Bucci
Assistant Examiner—Marcus Charles
(74) Attorney, Agent, or Firm—Flynn, Thiel, Boutell & Tanis, P.C.

(57) ABSTRACT

A continuously variable transmission wherein a driving pulley comprising a fixed driving pulley piece and a movable driving pulley piece is mounted on a driving shaft, a driven pulley comprising a fixed driven pulley piece and a movable driven pulley piece is mounted on a driven shaft disposed in parallel with the driving shaft, and a belt is entrained on both the driving pulley and the driven pulley. A torque converter and a forward/reverse change-over mechanism are disposed on an input side of the driving shaft with respect to the driving pulley, and an output clutch is disposed on an output side of the driven shaft with respect to the driven pulley.

12 Claims, 7 Drawing Sheets

CONTINUOUSLY VARIABLE TRANSMISSION

FIELD OF THE INVENTION

The present invention relates to a continuously variable transmission and more particularly a continuously variable transmission which, while ensuring a compact layout, can make a change of speed during stop of the associated vehicle, can protect a belt at the time of sudden braking, and can improve the starting performance of the vehicle.

BACKGROUND OF THE INVENTION

In a vehicle, a transmission is provided in a path between an engine and driving wheels to make conversion into a rotational speed and a torque, both corresponding to required characteristics. As such a transmission, there is known a continuously variable transmission wherein a driving pulley comprising a fixed driving pulley piece and a movable driving pulley piece is mounted on a driving shaft, a driven pulley comprising a fixed driving pulley piece and a movable driven pulley piece is mounted on a driven shaft, and a belt is entrained on both the driving pulley and the driven pulley.

Figure 3:
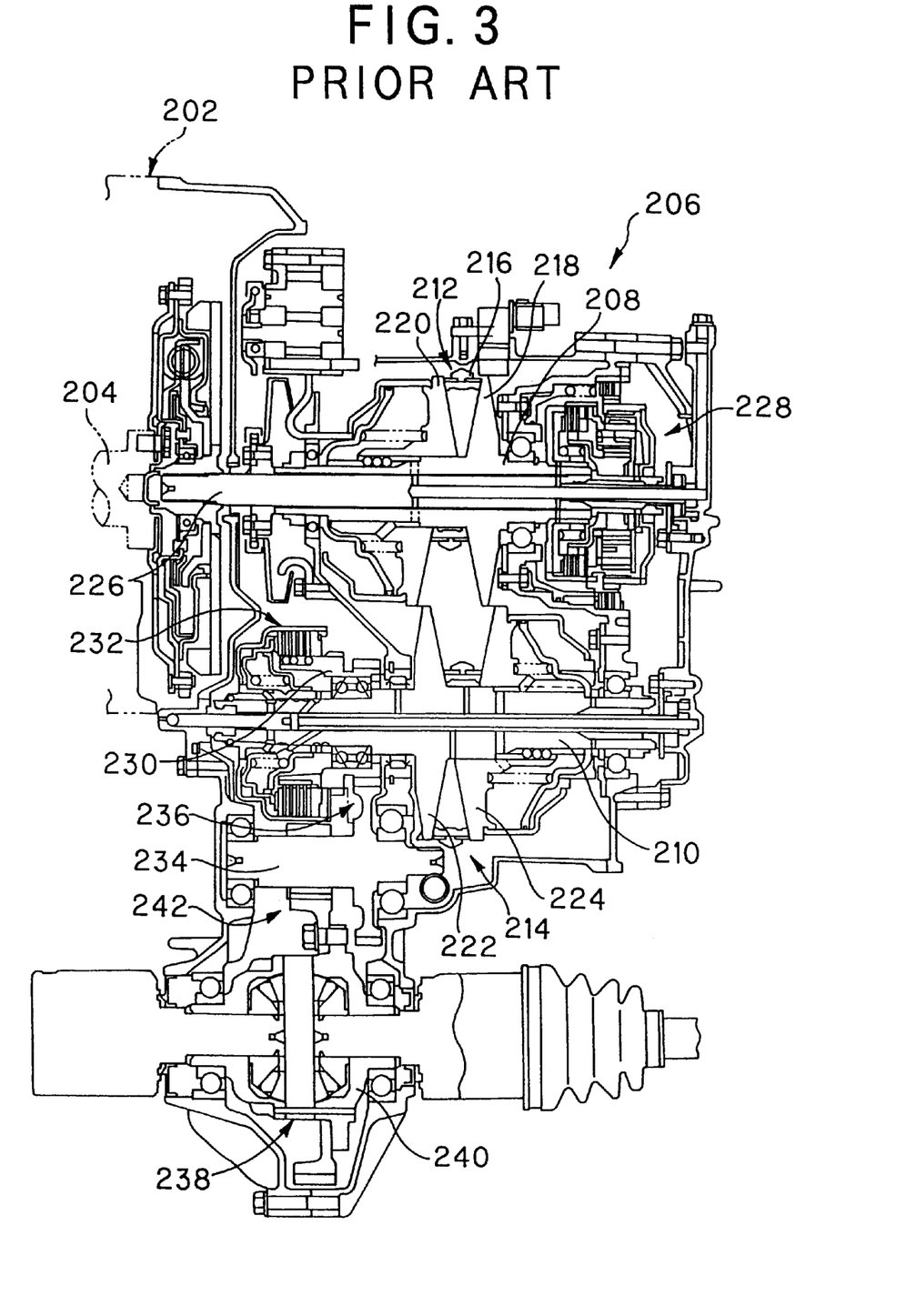
FIG. 3 is a sectional view showing a first example of a conventional continuously variable transmission.

FIG. 3 shows a conventional continuously variable transmission. In FIG. 3, the reference numeral 202 denotes an engine, 204 denotes a crank shaft, 206 denotes a continuously variable transmission, 208 a driving shaft, 210 a driven shaft, 212 a driving pulley, 214 a driven pulley, and 216 a belt. In the continuously variable transmission 206, the driving pulley 212 is mounted on the driving shaft 208 which is coaxial with the crank shaft 204 of the engine 202, the driven pulley 214 is mounted on the driven shaft 210 which is disposed in parallel with the driving shaft 208, and the belt 216 is entrained on both driving pulley 212 and driven pulley 214.

The driving pulley 212 comprises a first fixed driving pulley piece 218 fixed onto the driving shaft 208 and a second movable driving pulley piece 220 which is mounted on the driving shaft 208 in an axially movable and non-rotatable manner relative to the shaft 208. The driven pulley 214 comprises a first fixed driven pulley piece 222 fixed onto the driven shaft 210 and a second movable driven pulley piece 224 which is mounted on the driven shaft 210 in an axially movable and non-rotatable manner relative to the shaft 210.

In the continuously variable transmission 206, the driving shaft 208 is rotatably fitted on an input shaft 226 which is coaxial with the crank shaft 204, a forward/reverse change-over mechanism 228 is mounted on the input shaft 226 at a position between an output side/end of the input shaft 226 spaced apart from the engine 202 and an input side/end of the driving shaft 208 spaced apart a longer distance from the engine 202 than the driving pulley 212, an output shaft 230 is rotatably fitted on the driven shaft 210 on an output side/end closer to the engine 202 than the driven pulley 214, an output clutch 232 is disposed between the output side/end of the driven shaft 210 and the input side/end of the output shaft 230, a reduction gear train 236 is disposed between the output shaft 230 and a counter shaft 234 disposed in parallel with the output shaft 230, and a final gear train 242 is disposed between the counter shaft 234 and a differential case 240 of a differential 238 disposed in parallel with the counter shaft 234.

Figure 4:
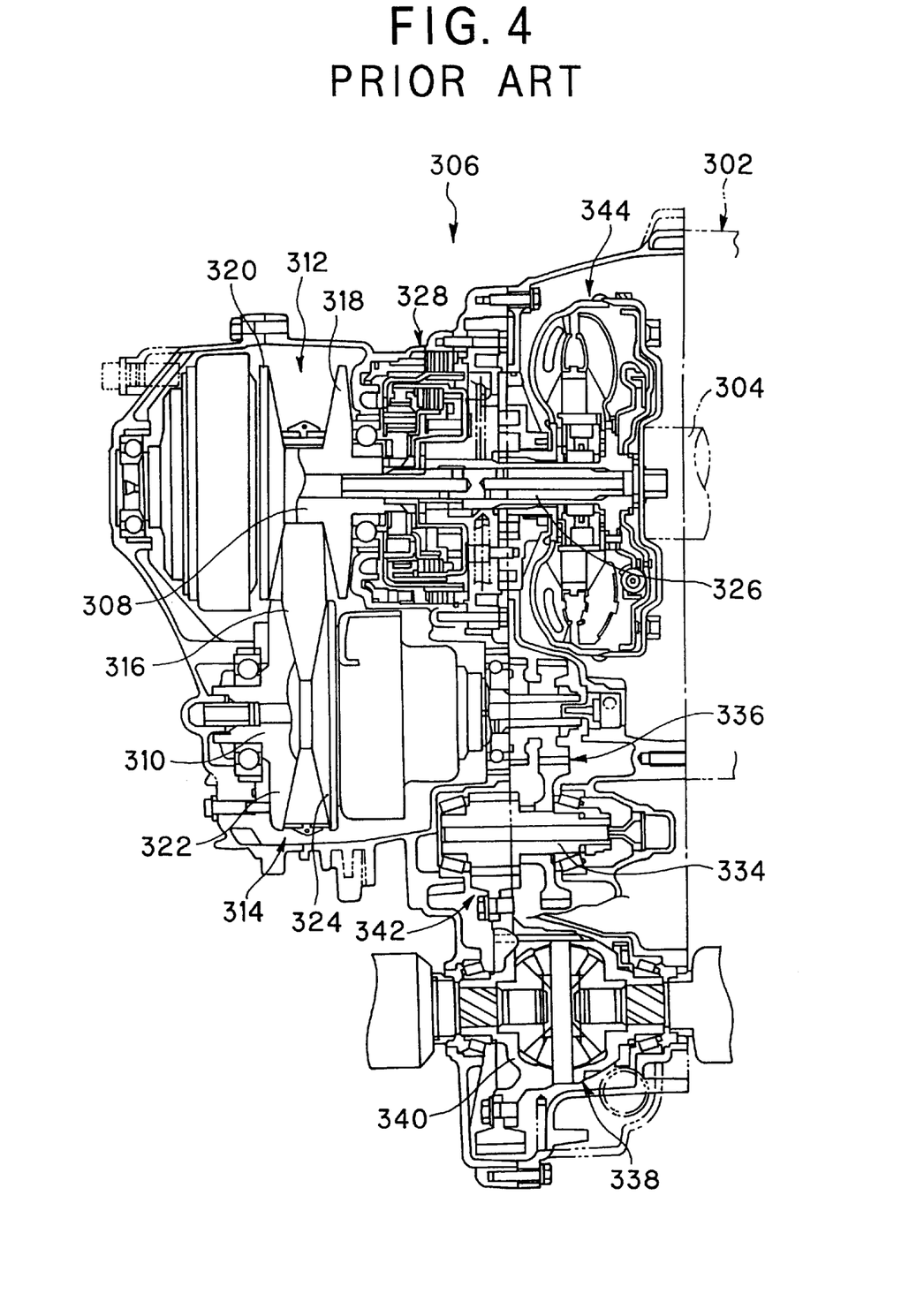
FIG. 4 is a sectional view showing a second example of a conventional continuously variable transmission.

In a continuously variable transmission 306 shown in FIG. 4, a driving pulley 312 comprising a first fixed driving pulley piece 318 and a second movable driving pulley piece 20 is mounted on a driving shaft 308 which is coaxial with a crank shaft 304 of an engine 302, a driven pulley 314 comprising a first fixed driven pulley piece 322 and a second movable driven pulley piece 324 is mounted on a driven shaft 310 disposed in parallel with the driving shaft 308, and a belt 316 is entrained on both driving pulley 312 and driven pulley 314.

In the continuously variable transmission 306, an input shaft 326, which is coaxial with the crank shaft 304 and the driving shaft 308, is mounted on an input side/end of the driving shaft 308 closer to the engine 202 than the driving pulley 312, a torque converter 344 and a forward/reverse change-over mechanism 328 are mounted on the input shaft 326, a reduction gear train 336 is disposed between an output side/end of the driven shaft 310 and a counter shaft 334 disposed in parallel with the driven shaft 310, and a final gear train 342 is disposed between the counter shaft 334 and a differential case 340 of a differential 338 disposed in parallel with the counter shaft 332.

Figure 5:
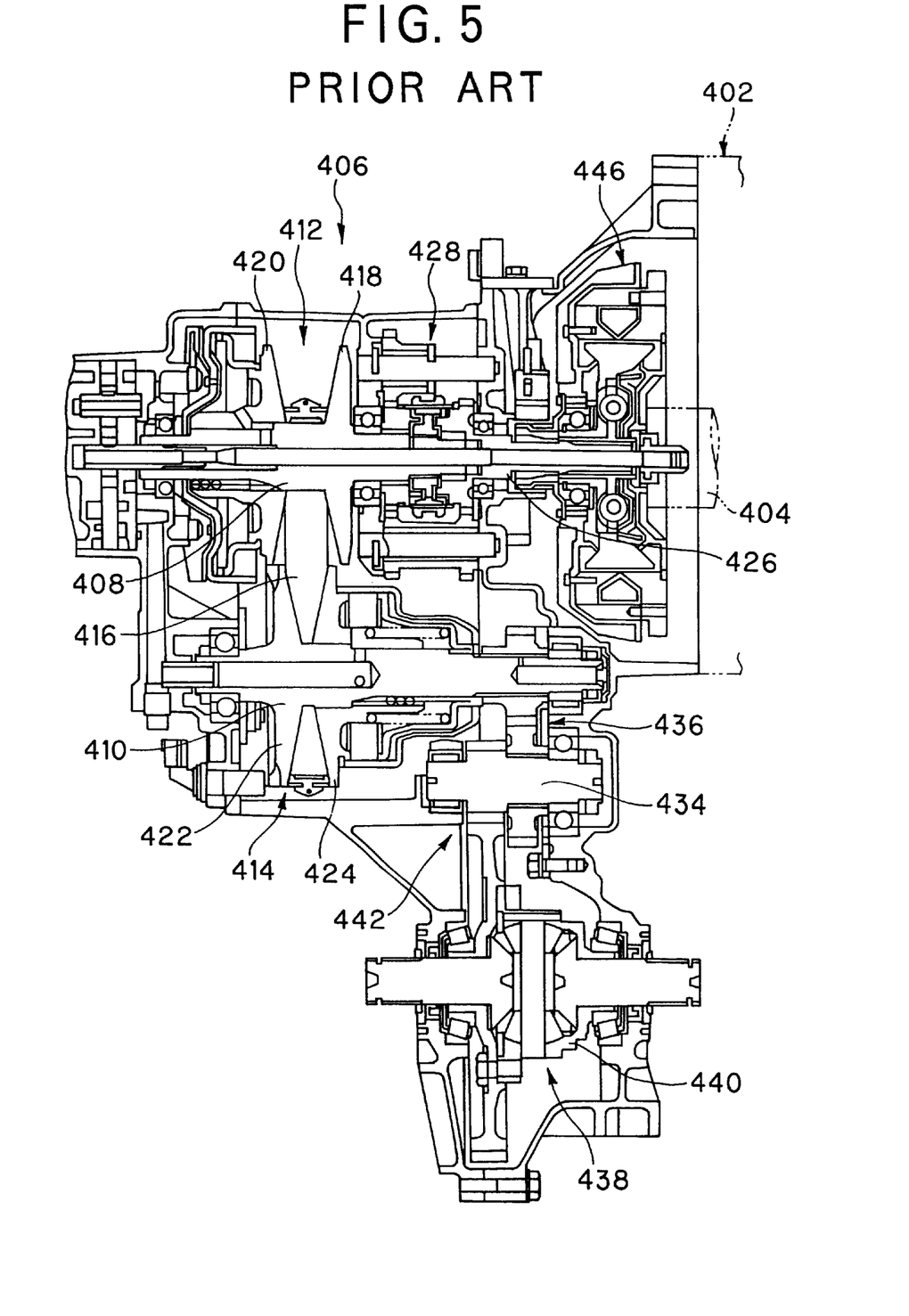
FIG. 5 is a sectional view showing a third example of a conventional continuously variable transmission.

In a continuously variable transmission 406 shown in FIG. 5, a driving pulley 412 comprising a first fixed driving pulley piece 418 and a second movable driving pulley piece 420 is mounted on a driving shaft 408 which is coaxial with a crank shaft 404 of an engine 402, a driven pulley 414 comprising a first fixed driven pulley piece 422 and a second movable driven pulley piece 424 is mounted on a driven shaft 410 disposed in parallel with the driving shaft 408, and a belt 416 is entrained on both driving pulley 412 and driven pulley 414.

In the continuously variable transmission 406, an input shaft 426 coaxial with both crank shaft 404 and driving shaft 408 is disposed on an input side/end of the driving shaft 408 closer to the engine 402 than the driving pulley 412, an electromagnetic clutch 446 and a forward/reverse change-over mechanism 428 are mounted on the input shaft 426, a reduction gear train 436 is disposed between an output side/end of the driven shaft 410 and a counter shaft 434 disposed in parallel with the driven shaft 410, and a final gear train 442 is disposed between the counter shaft 434 and a differential case 440 of a differential 438 disposed in parallel with the counter shaft 434.

Figure 6:
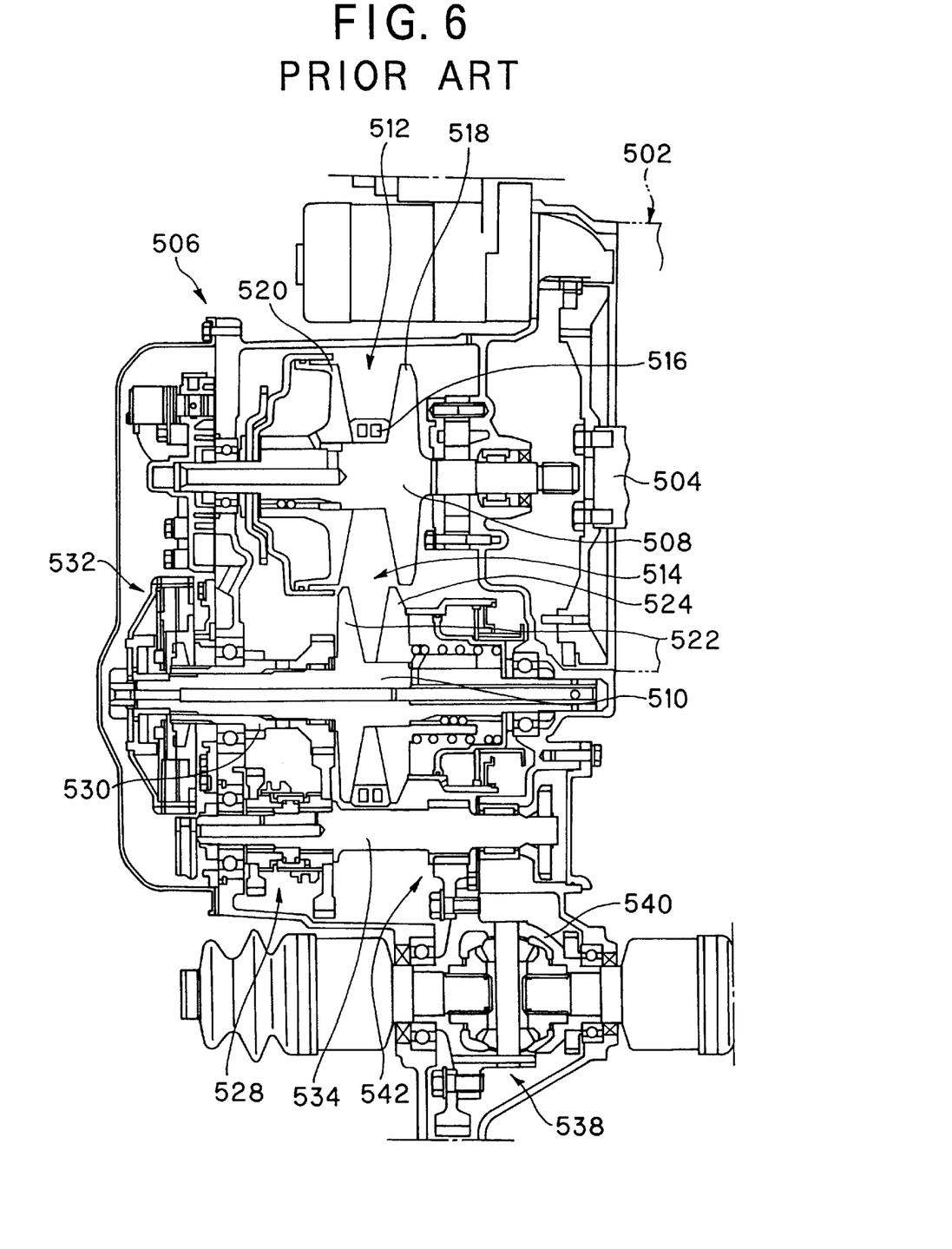
FIG. 6 is a sectional view showing a fourth example of a conventional continuously variable transmission.

In a continuously variable transmission 506 shown in FIG. 6, a driving pulley 512 comprising a first fixed driving pulley piece 518 and a second movable driving pulley piece 520 is mounted on a driving shaft 508 which is coaxial with a crank shaft 504 of an engine 502, a driven pulley 514 comprising a first fixed driven pulley piece 522 and a second movable driven pulley piece 524 is mounted on a driven shaft 510 disposed in parallel with the driving shaft 508, and a belt 516 is entrained on both driving pulley 512 and driven pulley 514.

In the continuously variable transmission 506, an output shaft 530 is rotatably fitted on the driven shaft 510 on an output side/end spaced apart a longer distance from the engine 502 than the driven pulley 514, an output clutch 532 is disposed between an output side/end of the driven shaft 510 and an input side/end of the output shaft 530 spaced apart from the engine 502, a forward/reverse change-over mechanism 528 is disposed between an output side/end of the output shaft 530 close to the engine 502 and an input side/end of a counter shaft 534 spaced apart from the engine 502, the counter shaft 534 being disposed in parallel with the output shaft 530, and a final gear train 542 is disposed between an output side/end of the counter shaft 534 close to the engine 502 and a differential case 540 of a differential 538 disposed in parallel with the counter shaft 534.

Figure 7:
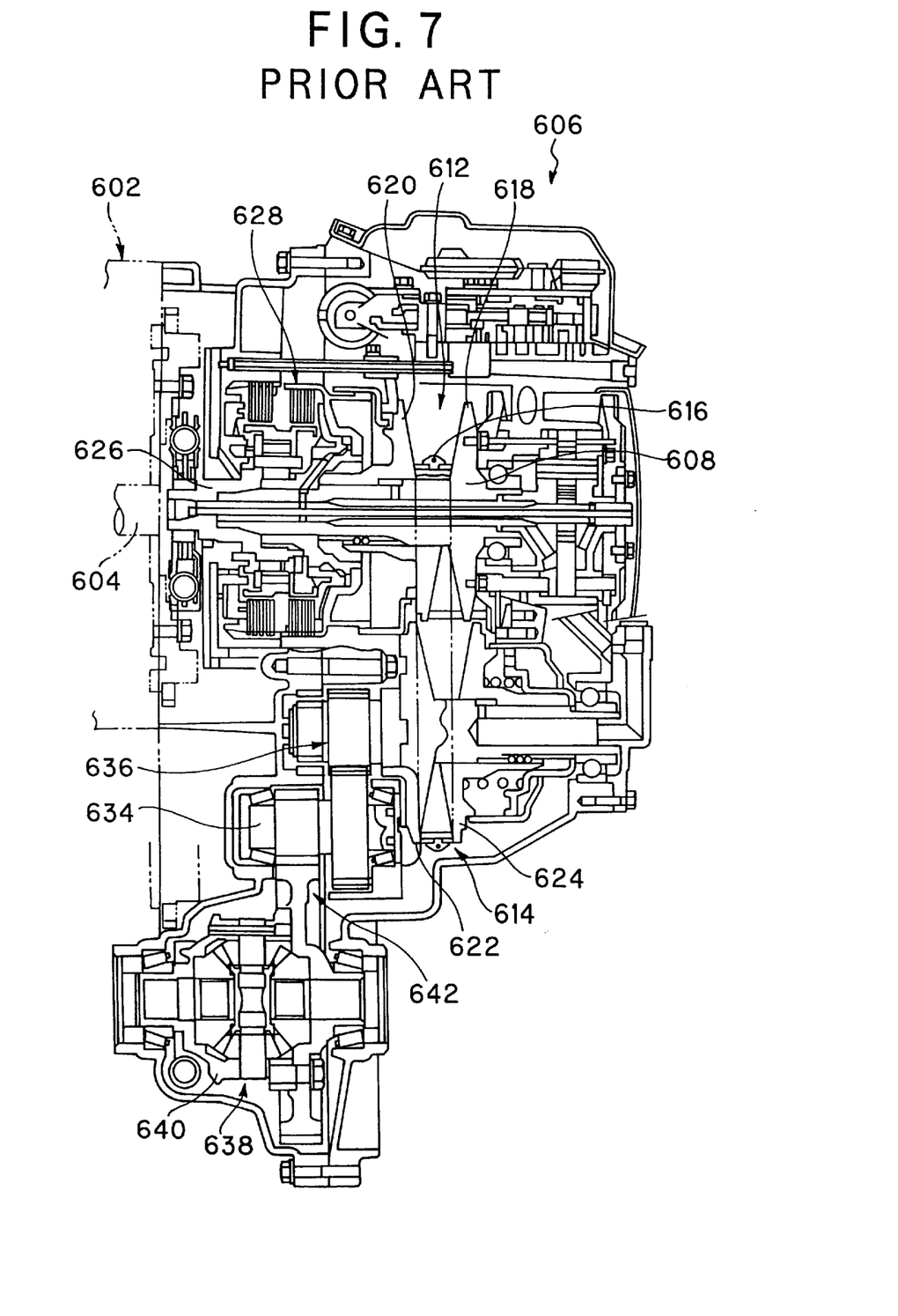
FIG. 7 is a sectional view showing a fifth example of a conventional continuously variable transmission.

In a continuously variable transmission 606 shown in FIG. 7, a driving pulley 612 comprising a first fixed driving pulley piece 618 and a second movable driving pulley piece 620 is mounted on a driving shaft 608 which is coaxial with a crank shaft 604 of an engine 602, a driven pulley 614 comprising a first fixed driven pulley piece 622 and a second movable driven pulley piece 624 is mounted on a driven shaft 610 disposed in parallel with the driving shaft 608, and a belt 616 is entrained on both driving pulley 612 and driven pulley 614.

In the continuously variable transmission 606, an input shaft 626 coaxial with both crank shaft 604 and driving shaft 608 is disposed on an input side/end of the driving shaft 608 closer to the engine 602 than the driving pulley 612, a forward/reverse change-over mechanism 628 is disposed between an output side/end of the input shaft 626 spaced apart from the engine 602 and an input side/end of the driving shaft 608 close to the engine 602, a reduction gear train 636 is disposed between an output side/end of the driven shaft 610 close to the engine 602 and a counter shaft 634 disposed in parallel with the driven shaft 610, and a final gear train 642 is disposed between the counter shaft 634 and a differential case 640 of a differential 638 disposed in parallel with the counter shaft 634.

Continuously variable transmissions of this type are disclosed in Japanese Published Unexamined Patent Application Nos. Hei 8-14344 and Hei 10-196749.

According to the descriptions of these unexamined publications, in a continuously variable transmission wherein a driving pulley comprising a first fixed driving pulley piece and a second movable driving pulley piece is mounted on a driving shaft which is coaxial with a crank shaft of an engine, a driven pulley comprising a first fixed driven pulley piece and a second movable driven pulley piece is mounted on a driven shaft disposed in parallel with the driving shaft, and a belt is entrained on both driving pulley and driven pulley, an input shaft coaxial with both crank shaft and driving shaft is disposed on an input side/end of the driving shaft closer to the engine than the driving pulley, a torque converter and a forward/reverse change-over mechanism are mounted on the said input shaft, a reduction gear train is disposed between the driven shaft and a counter shaft disposed in parallel with the driven shaft, and a final gear train is disposed between the counter shaft and a differential case of a differential disposed in parallel with the counter shaft.

In the conventional continuously variable transmission wherein the forward/reverse change-over mechanism is disposed on an output side/end of the driven shaft with respect to the driven pulley, the forward/reverse change-over mechanism is required to be large-sized for the transfer of an increased engine torque after deceleration with the belt, thus giving rise to the problem that the continuously variable transmission becomes larger in size.

On the other hand, in the continuously variable transmission wherein the forward/reverse change-over mechanism is disposed on an input side/end of the driving shaft, since the engine torque to be transferred is before deceleration with the belt and hence before increase thereof, it is possible to reduce the size of the forward/reverse change-over mechanism and therefore possible to attain the reduction in size of the continuously variable transmission.

Thus, where the forward/reverse change-over mechanism is provided on an input side/end of the driving shaft, it is possible to reduce the size of the continuously variable transmission, but since the driven pulley and driving wheels are directly connected to each other, it is impossible to rotate the driven pulley while the associated vehicle stops, thus making it impossible to change the belt ratio. Besides, in the event of sudden braking, a load is exerted on the belt from the driving wheels through the driven pulley, thus causing damage to the belt. Further, the belt ratio remains in a top condition at the time of sudden braking and it is impossible to change it into a low condition, thus resulting in deterioration of the vehicular starting performance.

Recently, therefore, it has been highly desired to realize a continuously variable transmission which, while ensuring a compact layout, can change speed during stop of the associated vehicle, can protect the belt from a sudden braking load, and can improve the vehicular starting performance.

According to the present invention, in order to eliminate or minimize the above-mentioned drawbacks, there is provided a continuously variable transmission wherein a driving shaft coaxial with a crank shaft of an engine is supported by a transmission case, a driven shaft disposed in parallel with the driving shaft is supported by the transmission case, a driving pulley is mounted on the driving shaft, the driving pulley comprising a first fixed driving pulley piece fixed onto the driving shaft and a second movable driving pulley piece mounted on the driving shaft in an axially movable and unrotatable manner, a driven pulley is mounted on the driven shaft, the driven pulley comprising a first fixed driven pulley piece fixed onto the driven shaft and a second movable driven pulley piece mounted on the driven shaft in an axially movable and unrotatable manner, and a belt is entrained on both the driving pulley and the driven pulley, the continuously variable transmission being characterized in that a torque converter and a forward/reverse change-over mechanism are disposed on an input side/end of the driving shaft with respect to the driving pulley, and an output clutch is disposed on an output side/end of the driven shaft with respect to the driven pulley.

Thus, in the continuously variable transmission of the present invention, a driving pulley comprising a fixed driving pulley piece and a movable driving pulley piece is mounted on a driving shaft, a driven pulley comprising a fixed driven pulley piece and a movable driven pulley piece is mounted on a driven shaft disposed in parallel with the driving shaft, a belt is entrained on both the driving pulley and the driven pulley, and a torque converter and a forward/reverse change-over mechanism are disposed on an input side of the driving shaft with respect to the driving pulley. According to this construction, since the forward/reverse change-over mechanism disposed on an input side/end of the driving shaft transfers the engine torque before deceleration with the belt and hence before increase thereof, it is possible to reduce the size of the same mechanism. Moreover, since an output clutch is disposed on an output side/end of the driven shaft with respect to the driven pulley, the driven pulley and driving wheels are not directly connected with each other, so that, during stop of the associated vehicle, it is possible to rotate the driven pulley and change the belt ratio. Further, in the event of sudden braking, there is no fear of a load being exerted on the belt from the driving wheels through the driven pulley and thus it is possible to change the belt ratio from top to low condition at the time of sudden braking.

DETAILED DESCRIPTION

An embodiment of the present invention will now be described with reference to FIGS. 1 and 2. In both figures, reference numeral 2 denotes an engine mounted on a vehicle (not shown), 4 denotes a crank shaft, 6 a continuously variable transmission, and 8 a transmission case. The transmission case 8 comprises first to third case portions 8-1 to 8-3, which have first to third case wall portions 6-1a to 6-3a, respectively.

In the continuously variable transmission 6, a driving shaft 10 disposed coaxially with the crank shaft 4 of the engine 2 is supported by the second and third case wall portions 8-2a, 8-3a of the transmission case 8, and a driven shaft 12 disposed in parallel with the driving shaft 10 is also supported by the second and third case wall portions 8-2a, 8-3a.

The driving shaft 10 is supported on one end thereof by the second case wall portion 8-2a of the second case portion 8-2 through a first driving-side bearing 14 and is supported on the opposite end thereof by the third case wall portion 8-3a of the third case portion 8-3 through a second driving-side bearing 16.

The driven shaft 12 is supported on one end thereof by the second case wall portion 8-2a of the second case portion 8-2 through a first driven-side bearing 18 and is supported on the opposite end thereof by the third case wall portion 8-3a of the third case portion 8-3 through a second driven-side bearing 20.

A driving pulley 22 is mounted on the driving shaft 10, a driven pulley 24 is mounted on the driven shaft 12, and a belt 26 is entrained on both driving pulley 22 and driven pulley 24.

The driving pulley 22 comprises a first fixed driving pulley piece 28 fixed on the driving shaft 10 on the second case wall portion 8-2a side thereof which is close to the engine 2, and a second movable driving pulley piece 30 mounted axially movably and unrotatably on the driving shaft 10 on the third case wall portion 8-3a side thereof which is spaced apart from the engine 2. At the back of the movable driving pulley piece 30, on the third case wall portion 8-3a side spaced apart from the engine 2, a driving-side oil pressure chamber 34 is formed by a driving-side oil pressure housing 32.

The driven pulley 24 comprises a first fixed driven pulley piece 36 fixed onto the driven shaft 12 on the third case wall portion 8-3a side spaced apart from the engine 2 and a second movable driven pulley piece 38 mounted axially movably and unrotatably on the driven shaft 12 on the second case wall portion 8-2a side close to the engine 2. At the back of the movable driven pulley piece 38, on the second case wall portion 8-2a side close to the engine 2, a driven-side oil pressure chamber 42 is formed by a driven-side housing 40, and within the driven-side oil pressure chamber 42 is disposed an adjusting spring 44 which urges the movable driven pulley piece 38 toward the fixed driven pulley piece 36.

The driving pulley 22 and the driven pulley 24 are adjusted as to their groove widths by the oil pressures fed to and discharged from the driving-side oil pressure chamber 34 and the driven-side oil pressure chamber 42, and the state of speed change is controlled by the driving pulley 22, while a required clamping force for the belt 26 is maintained by the driven pulley 24.

In the continuously variable transmission 6, a torque converter 46 and a forward/reverse change-over mechanism 48 are disposed on an input side with respect to the driving pulley 22 on the driving shaft 10.

An input shaft 50 coaxial with both crank shaft 4 and driving shaft 10 is disposed with its input side or end closer to the engine 2 than the fixed driving pulley piece 28 which constitutes the driving pulley 22 on the driving shaft 10. The input shaft 50, on an output side or end thereof, is carried on an input bearing (not shown) so that it can perform relative rotation with respect to the driving shaft 10.

The torque converter 46 is disposed between an output side or end of the crank shaft 4 and an input side or end of the input shaft 50, while the forward/reverse change-over mechanism 48 is disposed between an output side or end of the input shaft 50 and an input side or end of the driving shaft 10 at a position adjacent to the fixed driving pulley piece 28 of the driving pulley 22.

The torque converter 46 has a lock-up clutch 60 in addition to a pump impeller 54, a turbine runner 56 and a stator 58. The torque converter 46 increases the engine torque of the crank shaft 4 and transfers the increased torque to the input shaft 50.

The forward/reverse change-over mechanism 48 has a forward clutch portion (not shown), a reverse clutch portion 62, and a planetary gear (not shown). By engagement or disengagement of the forward clutch potion (not shown) and the reverse clutch portion 62 the forward/reverse change-over mechanism 48 causes the input shaft 50 to rotate forward or reverse and transfers the rotation to the driving shaft 10. The movable driven pulley piece 38 of the driven pulley 24 is mounted on the driven shaft 12 at a position which confronts the forward/reverse change-over mechanism 48.

An oil pump 64 is disposed between the torque converter 46 on the input shaft 50 and the forward/reverse change-over mechanism 48. The oil pump 64, which is secured to the second case portion 8-2, is driven by the input shaft 50 and supplies the generated oil pressure to the driving-side oil pressure chamber 34 of the driving pulley 22, also to the driven-side oil pressure chamber 42 of the driven pulley 24, and further to an oil pressure chamber 84 of an output clutch 74 which will be described later.

On an output side of the driven shaft 12, an output shaft 66 coaxial with the driven shaft 12 is supported by both the driven shaft 12 and the transmission case 8.

More specifically, the output shaft 66 is supported on one side or end thereof by the first case wall portion 8-1a of the first case portion 8-1 through a first output bearing 68 and is supported on the opposite side or end thereof through a second output bearing 70 on the driven shaft 12 projecting from the second case wall portion 8-2a of the second case portion 8-2. Further, an oil passage shaft 72 is fitted on one side thereof in the first case wall portion 8-1a of the first case portion 8-1 and is inserted on the opposite side thereof rotatably into the output shaft 66.

An output clutch 74 is mounted on the driven shaft 12 on an output side with respect to the driven pulley 24. The output clutch 74 is positioned between an output side of the driven shaft 12 and an input side of the output shaft 66.

The output clutch 74 comprises a clutch hub 76 fixed on the output side of the driven shaft 12, a clutch housing 78 fixed on the input side of the output shaft 66, a plurality of clutch plates 80 fixed to both clutch hub 76 and clutch housing 78, a piston 82 which causes the clutch plates 80 to be urged and abutted against each other, and an oil pressure chamber 84 for pushing the piston 82. When the piston 82 is pushed by the oil pressure fed to the oil pressure chamber 84 and the clutch plates 80 are thereby urged and abutted against each other, the output clutch 74 is engaged.

A counter shaft 86 disposed in parallel with the output shaft 66 is supported by the transmission case 8. More specifically, the counter shaft 86 is supported on one side or end thereof by the first case wall portion 8-1a of the first case portion 8-1 through a first counter bearing 88 which is a ball bearing and is supported on the opposite side or end thereof (which side confronts the movable driven pulley piece 38) by the second case wall portion 8-2a of the second case portion 8-2 through a second counter bearing 90 constituted by a roller bearing.

A reduction gear train 92 is disposed between the output shaft 66 and the counter shaft 86. The reduction gear train 92 comprises a driving reduction gear 94 mounted on the first case portion 8-1a side of the output shaft 66 and a driven reduction gear 96 mounted on the first case wall portion 8-1a side of the counter shaft 68.

Figure 1:
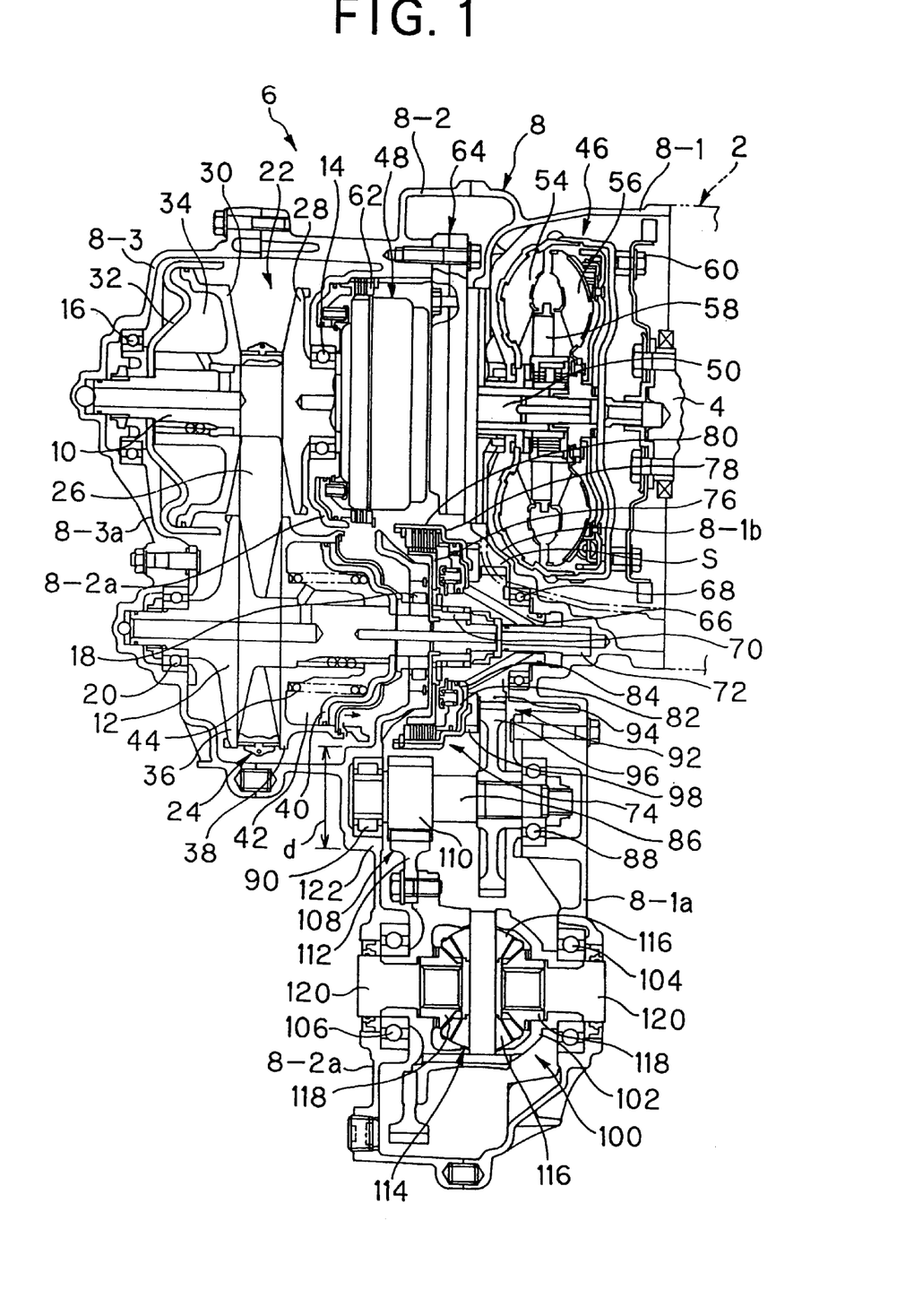
FIG. 1 is a sectional view taken on line 1—1 in FIG. 2, showing a continuously variable transmission according to an embodiment of the present invention.
Figure 2:
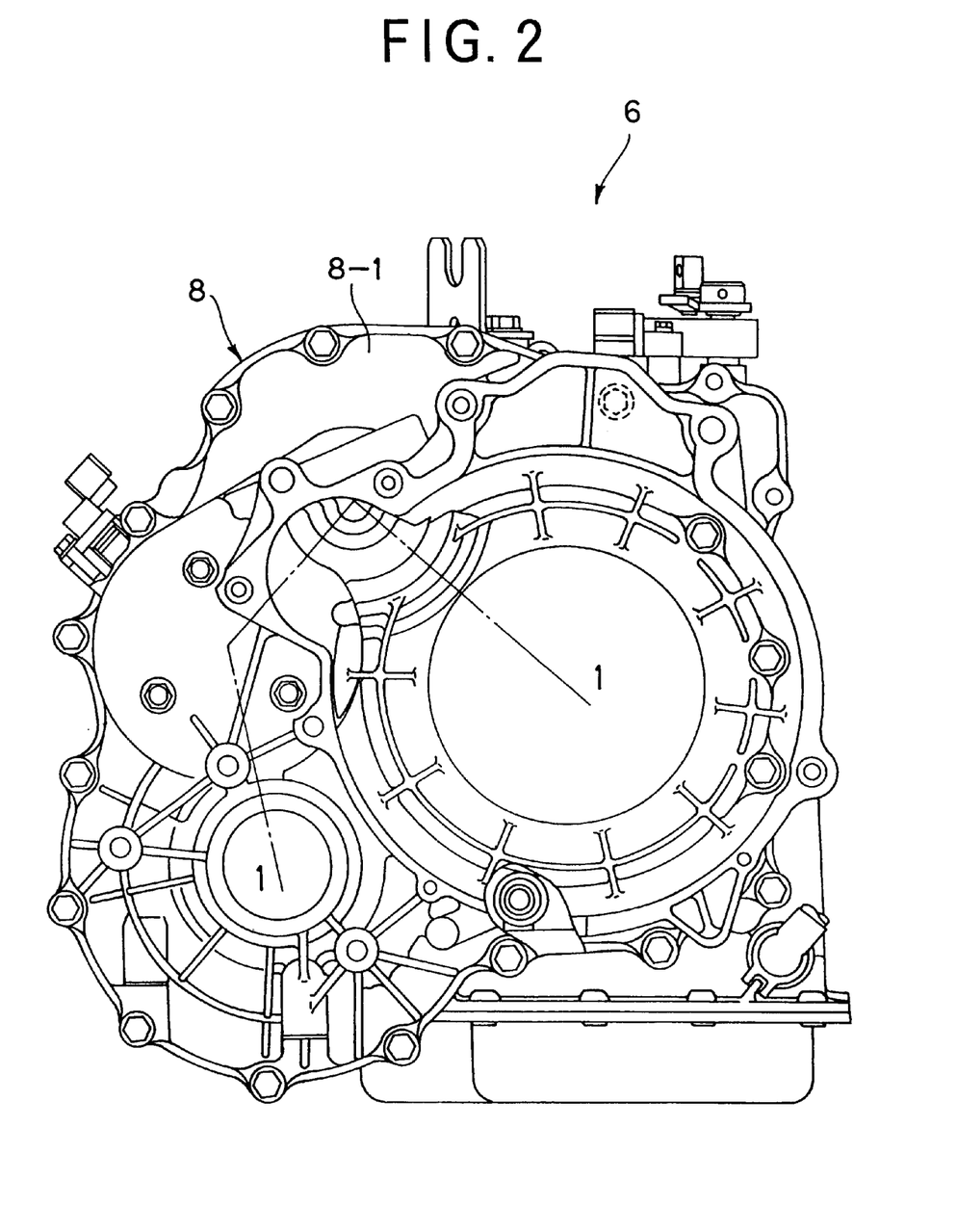
FIG. 2 is a side view of the continuously variable transmission.

In the first case portion 8-1, a part of the first case wall portion 8-1a, indicated at 8-1b, is shifted from the position indicated with a dash-double dot line in FIG. 1 to the position indicated with a solid line so as to extend along the external form of the torque converter 46. The wall portion 8-1b as part of the first case wall portion 8-1a is thus formed in conformity with the external form of the torque converter 46 and the driving reduction gear 94 in the reduction gear train 92 is disposed on the first case wall portion 8-1a side of the output shaft 66.

A parking gear 98 is mounted on the output shaft 66 at a position between the clutch housing 78 of the output clutch 74 and the driving reduction gear 94 in the reduction gear train 92.

A differential 100 disposed in parallel with the counter shaft 68 is supported by the transmission case 6. A differential case 102 of the differential 100 is supported on one side thereof by the first case wall portion 8-1a of the first case portion 8-1 through a first differential bearing 104 and is supported on the opposite side thereof by the second case wall portion 8-2a of the second case portion 8-2 through a second differential bearing 106.

A final gear train 108 is disposed between the counter shaft 86 and the differential case 102 of the differential 100. The final gear train 108 comprises a final driving gear 110 disposed on the second wall portion 8-2a side of the counter shaft 86 and a final driven gear 112 disposed on the second case wall portion 8-2a side of the differential case 102.

The differential 100 has a differential gear train 114 incorporated in the differential case 102. The differential gear train 114 comprises a pair of differential pinions 116 and a pair of differential side gears 118. One ends of driving shafts 120 are connected respectively to the differential side gears 118, with vehicle driving wheels (not shown) being secured to the opposite ends of the driving shafts 120.

In the continuously variable transmission 6, as described above, the driving pulley 22 comprising the fixed driving pulley piece 28 and the movable driving pulley piece 30 is mounted on the driving shaft 10 which is coaxial with the crank shaft 4 of the engine 2, the driven pulley 24 comprising the fixed driven pulley piece 36 and the movable driven pulley piece 38 is mounted on the driven shaft 12 disposed in parallel with the driving shaft 10, and the belt 26 is entrained on both driving pulley 22 and driven pulley 24.

The torque converter 46 and the forward/reverse change-over mechanism 48 are disposed on an input side of the driving shaft 10 closer to the engine 2 than the fixed driving pulley piece 28 of the driving pulley 22. Consequently, the forward/reverse change-over mechanism 48 disposed on the input side of the driving shaft 10 transfers the engine torque before deceleration with the belt 26 and hence before increase, thus permitting reduction of its size.

In this connection, the driving-side oil pressure chamber 34 in the movable driving pulley piece 30 as a constituent of the driving pulley 22 is formed on the side or end of the driving shaft 10, which is spaced apart from the engine 2 whereby it is possible to eliminate a dead space and attain a reduction of size.

Moreover, since the output clutch 74 is mounted on an output side of the driven shaft 12 with respect to the driven pulley 24, the driven pulley 24 is not directly connected to driving wheels (not shown). Consequently, while the vehicle stops, the belt ratio can be changed by rotating the driven pulley 24, and at the time of sudden braking the belt ratio can be changed from high to low condition, with no load exerted from the driving wheels through the driven pulley 24 on the belt 26.

Thus, during stop of the vehicle, the belt ratio can be changed and therefore it is possible to make a change of speed. Also at the time of sudden braking, the belt 24 can be protected because no load is applied to the belt from the driving wheels, and the belt ratio can be changed from top to low condition, thus making it possible to improve the starting performance of the vehicle.

As a result, while the reduction in size of the continuously variable transmission 6 can be attained by the reduction in size of the forward/reverse change-over mechanism 48, it is possible to make a change of speed during stop of the vehicle, and it is also possible to protect the belt 24 at the time of sudden braking and improve the vehicular starting performance.

Further, since the wall portion 8-1b as part of the first case wall portion 8-1a of the first case portion 8-1 is shifted from the position indicated with a dash-double dot line in FIG. 1 to the position indicated with a solid line, a space S can be created on the output clutch 74 side and the driving reduction gear 94 is provided on the first case wall portion 8-1a side of the output shaft 66.

Thus, in addition to the reduction in size attained by the reduction in size of the forward/reverse change-over mechanism 48, the continuously variable transmission 6 can be further reduced in size by the provision of the driving reduction gear 94 on the first case wall portion 8-1a side of the output shaft 66.

By utilizing the space S thus created, the parking gear 98 is disposed between the clutch housing 78 of the output clutch 74 and the driving reduction gear 94 of the reduction gear train 92. The parking gear 98 can be so disposed without causing an increase of size.

Further, since the opposite side of the counter shaft 86 (which side confronts the movable driven pulley piece 38) is supported by the second case wall portion 8-2a of the second case portion 8-2 through the second counter bearing 90, which is a roller bearing, it is possible to diminish the diameter d of a second counter bearing holding portion 122 which holds the second counter bearing 90 secured to the second case wall portion 8-2*a*.

Consequently, as indicated with a dash-double dot line, this construction permits the use of the second counter bearing 90 in a compact size and with a sufficient bearing capacity while avoiding interference with the movable driven pulley piece 38 which moves axially.

Although in this embodiment the torque converter 46 and the forward/reverse change-over mechanism 48 are disposed on an input side of the driving shaft 10 with respect to the driving pulley 22 and the output clutch 74 is disposed on an output side of the driven shaft 12 with respect to the driven pulley 24, their positions may be changed as necessary.

For example, the torque converter 46 and the output clutch 74 may be disposed on the input side of the driving shaft 10 and the forward/reverse change-over mechanism 48 may be disposed on the output side of the driven shaft 12. According to this arrangement, as is the case with the above embodiment, the driven pulley 24 and the driving wheels (not shown) are not directly connected with each other and the belt ratio can be changed while the vehicle stops. Besides, at the time of sudden braking, no load is imposed on the belt 26 and the belt ratio an be changed from top to low condition, so that it is possible to make a change of speed during stop of the vehicle and protect the belt 24 at the time of sudden braking, thus permitting improvement of the vehicular starting performance.

In the continuously variable transmission according to the present invention, as set forth hereinabove, since the forward/reverse change-over mechanism disposed on an input side of the driving shaft with respect to the driving pulley transfers the engine torque before deceleration with the belt and hence before increase, it is possible to reduce the size of the forward/reverse change-over mechanism. Besides, since the output clutch is disposed on an output side of the driven shaft with respect to the driven pulley, the driven pulley and the driving wheels are not directly connected with each other, so that the belt ratio can be changed by rotating the driven pulley while the vehicle stops, and at the time of sudden braking, no load acts on the belt from the driving wheels through the driven pulley and it is possible to change the belt ratio from top to low condition.

Thus, while the reduction in size of the continuously variable transmission is attained by the reduction in size of the forward/reverse change-over mechanism, it is possible to make a change of speed during stop of the vehicle, and at the time of sudden braking it is possible to protect the belt and improve the vehicular starting performance.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A continuously variable transmission wherein a driving shaft coaxial with a crank shaft of an engine is rotatably supported by a transmission case, a driven shaft disposed in parallel with said driving shaft is rotatably supported by said transmission case, a driving pulley is mounted on said driving shaft, said driving pulley comprising a first driving pulley piece fixed onto said driving shaft and a second driving pulley piece mounted on the driving shaft in an axially movable and non-rotatable manner relative to the driving shaft, a driven pulley is mounted on said driven shaft, said driven pulley comprising a first driven pulley piece fixed onto said driven shaft and a second driven pulley piece mounted on the driven shaft in an axially movable and non-rotatable manner relative to the driven shaft, and a belt is entrained on both said driving pulley and said driven pulley, wherein a torque converter and a forward/reverse change-over mechanism are disposed on an input side of said driving shaft with respect to said driving pulley, an output clutch is disposed on an output side of said driven shaft with respect to said driven pulley, one side of a counter shaft is supported by said transmission case through a ball bearing, and an opposite side of the counter shaft confronts said second driven pulley piece and is supported by the transmission case through a roller bearing.

2. A continuously variable transmission according to claim 1, wherein an input shaft coaxial with both said crank shaft and said driving shaft is provided on the input side of said driving shaft with respect to said driving pully, said torque converter is disposed between an output side of said crank shaft and an input side of said input shaft, and said forward/reverse change-over mechanism is disposed between an output side of said input shaft and the input side of said driving shaft and at a position adjacent to said driving pulley.

3. A continuously variable transmission according to claim 1, wherein said second driven pulley piece is provided on said driven shaft at a position which confronts said forward/reverse change-over mechanism mounted on said driving shaft.

4. A continuously variable transmission according to claim 1, wherein an output shaft is disposed on the output side of said driven shaft coaxially with the driven shaft and is supported by both said driven shaft and said transmission case, said counter shaft is disposed in parallel with said output shaft, said output clutch is disposed between the output side of said driven shaft and an input side of said output shaft, and a reduction sear train is disposed between said output shaft and said counter shaft.

5. A continuously variable transmission according to claim 2, wherein an oil pump is mounted on said input shaft at a position between said torque converter and said forward/reverse change-over mechanism.

6. A continuously variable transmission according to claim 4, wherein a differential disposed in parallel with said counter shaft is supported by said transmission case, and a final gear train is disposed between the counter shaft and a differential case of said differential.

7. A continuously variable transmission wherein a driving shaft coaxial with a crank shaft of an engine is rotatably supported by a transmission case, a driven shaft disposed in parallel with said driving shaft is rotatably supported by said transmission case, a driving pulley is mounted on said driving shaft, said driving pulley comprising a first driving pulley piece fixed onto said driving shaft and a second driving pulley piece mounted on the driving shaft in an axially movable and non-rotatable manner relative to the driving shaft, a driven pulley is mounted on said driven shaft, said driven pulley comprising a first driven pulley piece fixed onto said driven shaft and a second driven pulley piece mounted on the driven shaft in an axially movable and non-rotatable manner relative to the driven shaft, and a belt is entrained on both said driving pulley and said driven pulley, wherein a torque converter and a forward/reverse change-over mechanism are disposed on an input side of said driving shaft with respect to said driving pulley, an output clutch is disposed on an output side of said driven shaft with respect to said driven pulley, an output shaft is disposed on the output side of the driven shaft, and a parking gear is mounted on said output shaft at a position between said output clutch and a driving reduction gear.

8. A continuously variable transmission according to claim 7, wherein an input shaft coaxial with both said crank shaft and said driving shaft is provided on the input side of said driving shaft with respect to said driving pulley, said torque converter is disposed between an output side of said crank shaft and an input side of said input shaft, and said forward/reverse change-over mechanism is disposed between an output side of said input shaft and the input side of said driving shaft and at a position adjacent to said driving pulley.

9. A continuously variable transmission according to claim 5, wherein said second driven pulley piece is provided on said driven shaft at a position which confronts said forward/reverse change-over mechanism mounted on said driving shaft.

10. A continuously variable transmission according to claim 5, wherein the output shaft is coaxial with the driven shaft and is supported by both said driven shaft and said transmission case, a counter shaft is disposed in parallel with said output shaft and is supported by said transmission case, said output clutch is disposed between the output side of said driven shaft and an input side of said output shaft, and a reduction gear train is disposed between said output shaft and said counter shaft.

11. A continuously variable transmission according to claim 9, wherein an oil pump is mounted on said input shaft at a position between said torque converter and said forward/reverse change-over mechanism.

12. A continuously variable transmission according to claim 10, Wherein a differential disposed in parallel with said counter shaft is supported by said transmission case, and a final gear train is disposed between the counter shaft and a differential case of said differential.

* * * * *